UNITED STATES PATENT OFFICE.

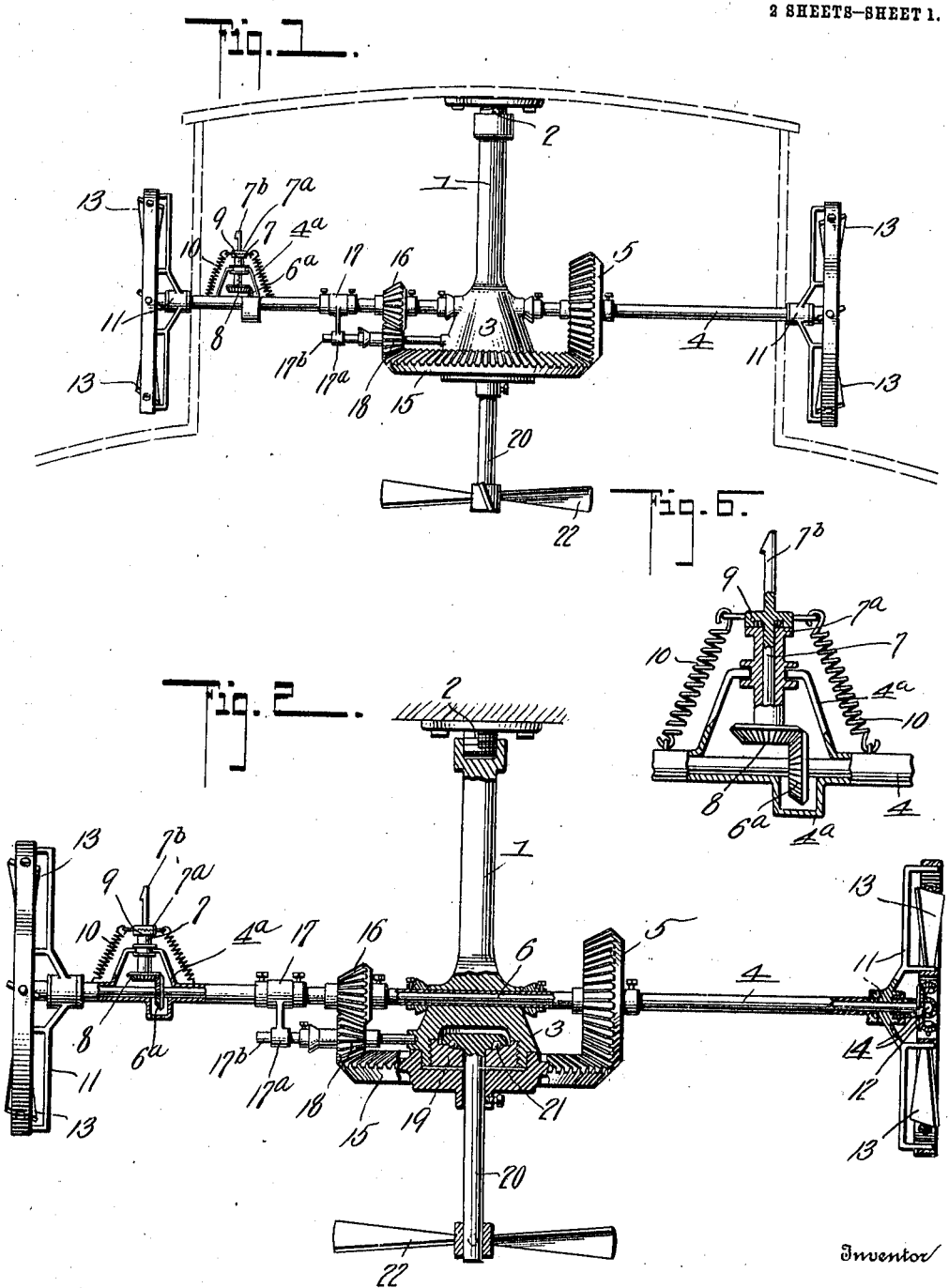

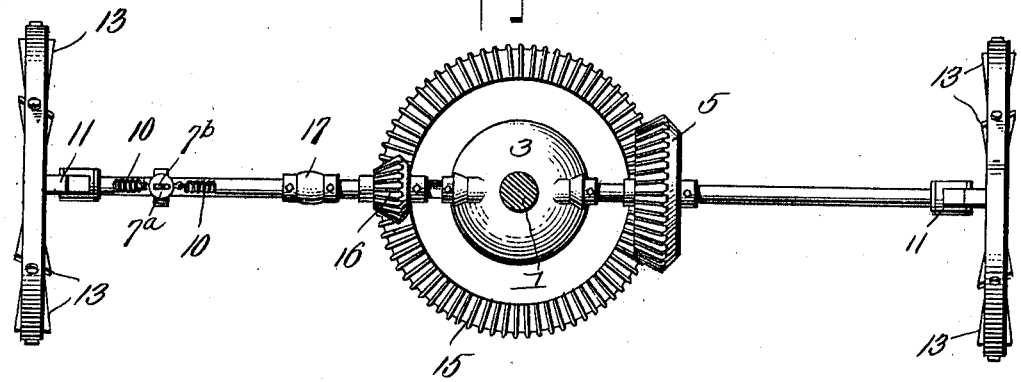
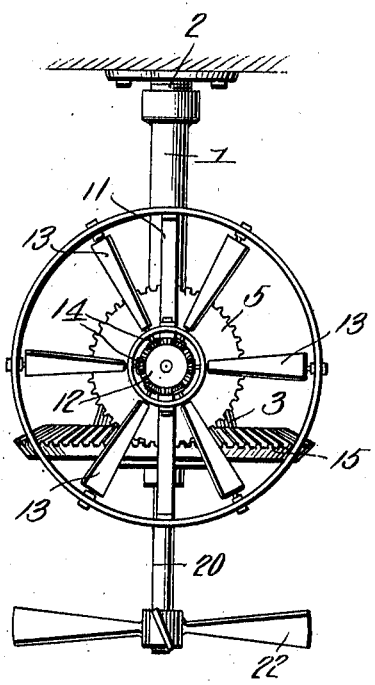
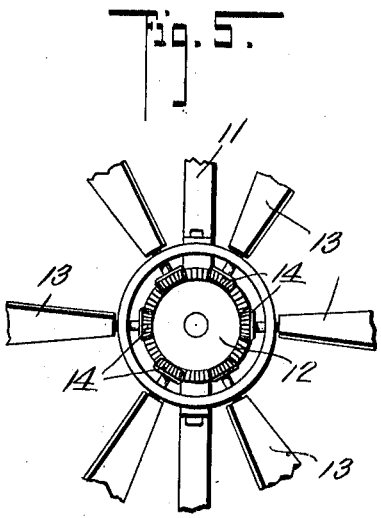

PHILIP P. RYAN, OF HARTFORD, CONNECTICUT.

ROTARY FAN.

982,691.  Specification of Letters Patent.  Patented Jan. 24, 1911.

Application filed February 24, 1908. Serial No. 417,353.

*To all whom it may concern:*

Be it known that I, PHILIP P. RYAN, a citizen of the United States, residing at Hartford, in the county of Hartford and State of Connecticut, have invented a new and useful Improvement in Rotary Fans, of which the following is a specification.

This invention relates to a ventilating fan adapted especially for use in connection with steam or electric cars, and the object of the invention is a fan driven by supplemental fans which receive their motion from the current of air created by the traveling of the car, so that no spring or other motor is necessary.

The invention consists of the novel features of construction hereinafter described, pointed out in the claims and shown in the accompanying drawings, in which—

Figure 1 is a side elevation of my complete device, shown in position. Fig. 2 is a sectional side elevation, parts being broken away and shown in section to more clearly illustrate the construction. Fig. 3 is a plan view, a depending shaft being shown in cross section. Fig. 4 is an end view. Fig. 5 is an enlarged detail end view showing the hub portion of one of the drive fans. Fig. 6 is a detail sectional view of a clutch mechanism.

In constructing the device I suspend from the central portion of a car roof a fixed vertical standard 1 the upper portion of which is secured upon a threaded bolt 2 carried by the car roof and which may form a depending part of a suitable plate fastened to the ceiling. The lower end of the standard 1 terminates in a bell-shaped hanger 3 in which is horizontally journaled a hollow shaft 4 upon which is fixed a beveled gear wheel 5. Within the shaft 4 is placed a shaft 6 which normally turns with the shaft 4 but is adapted for independent rotation. The shaft 4 is provided near one end with an enlargement 4ª and within this enlarged portion the shaft 6 is provided with a beveled gear 6ª. A vertical shaft 7 also hollow and which carries a clutch member 7ª is journaled in the enlargement 4ª at right angles to the shaft 6 and a handle 7ᵇ slides in the shaft 7 and is provided with a ratchet clutch 9 which is normally forced by two extension springs 10 out of engagement with the clutch member 7ª. The clutch member 7ª and ratchet 9 are so cut that they coöperate together forming a two part clutch, so that when the handle 7ᵇ is forced inwardly bringing the member 7ª and ratchet 9 together and compressing the springs 10 the handle will be locked to the shaft. When the handle is released the springs 10 will again stretch to their normal proportions and will force the clutch members apart. The shaft 7 also carries a beveled gear 8 meshing with the beveled gear 6ª. Upon the outer ends of the shaft 4, which ends project through opposite sides of the gear, are fixed fan frames 11 and the outer ends of the shaft 6 which project slightly beyond the ends of the hollow shaft 4 are provided with beveled gears 12. Fan blades 13 are mounted rotatably in the frames 11, and each blade carries at its inner end a small beveled gear 14 which meshes with its coöperating beveled gear 12.

A large beveled gear 15 is mounted upon the lower end of the hanger 3 and meshes with the beveled gear 5, and to secure balance and smooth rotation of the gear 15 I also place a beveled gear 16 upon the shaft 6 on the side of the hanger 3 opposite the beveled gear 5 and also upon the same shaft a sleeve 17 which has supports and suitable bearings 17ª for a short shaft 17ᵇ upon which is mounted an idle beveled gear 18 meshing with the beveled gears 15 and 16. The beveled gear 15 is securely fixed to a shaft 20 which is journaled in a plug 19 threaded into a suitable recess in the lower face of the hanger 3, the upper end of the shaft 20 being suitably flanged to form a race-way for anti-friction balls 21 which run upon the upper face of the plug 19. The shaft 20 carries at its lower end a suitable fan 22.

In use the fan blades 13 will be operated by impact of the air due to the travel of the car and will drive the fan 22 through rotation of the hollow shaft 4 and the gearing shown and described. The speed of the fan can be regulated by shifting the angle of inclination of the blades 13. To shift these blades, the handle 7ᵇ is grasped, moved inwardly, bringing the clutch mechanism into operative position, and is then turned rotating the beveled gears 8 and 6ª, shaft 6, beveled gears 12, and the pinions 14 carried by the inner ends of the blades, thus feathering the blades to the desired extent.

The handle 7ᵇ is hook-shaped at its outer end to enable the operator to secure a firm grasp or to enable him to engage the handle with a suitable implement when the handle cannot readily be reached from a car seat or a stand, as it will be obvious that the device will be located adjacent the car roof where the fan 22 cannot come in contact with heads or arms of passengers.

Having thus fully described my invention, what I claim as new and desire to secure by Letters Patent is:—

1. In a device of the kind described a hollow shaft, a fan frame thereon, radially arranged blades carried by the frame, beveled gears arranged at the inner ends of said blades, a shaft arranged within the hollow shaft first mentioned, said last mentioned shaft being adapted for independent rotation, means for rotating the said last mentioned shaft independently of rotation of the hollow shaft, and a beveled gear carried by the said independently rotated shaft and meshing with the beveled gears carried by the fan blades.

2. A device of the kind described comprising a depending hanger arranged within a car, a hollow shaft rotatably journaled through said hanger and extending transversely through the car, the ends of the shaft projecting, fans fixed upon the projecting ends of said hollow shaft, said fans including radially arranged rotatable blades, a ventilating fan suspended from said hanger, means for transmitting rotation of the hollow shaft to the ventilating fan, and means arranged partially within said hollow shaft and projecting therefrom for feathering the blades of the exterior fans.

3. A device of the kind described comprising a hollow shaft, fan frames mounted thereon, radially arranged rotatable blades carried by said fan frames, beveled gears carried by the inner ends of said blades, a shaft extending entirely through the hollow shaft and projecting from its ends, beveled gears upon the projecting ends of the inner shaft, said beveled gears meshing with the beveled gears of the fan blades, and means projecting through the hollow shaft for rotating the inner shaft independent of rotation of the hollow shaft, the said inner shaft normally rotating with the hollow shaft.

PHILIP P. RYAN.

Witnesses:
 Thomas K. Kennedy,
 Chas. R. Cole.